Nov. 14, 1944.   F. KRAMER   2,362,904
JOINT FOR DEMOUNTABLE FURNITURE
Filed Jan. 20, 1943
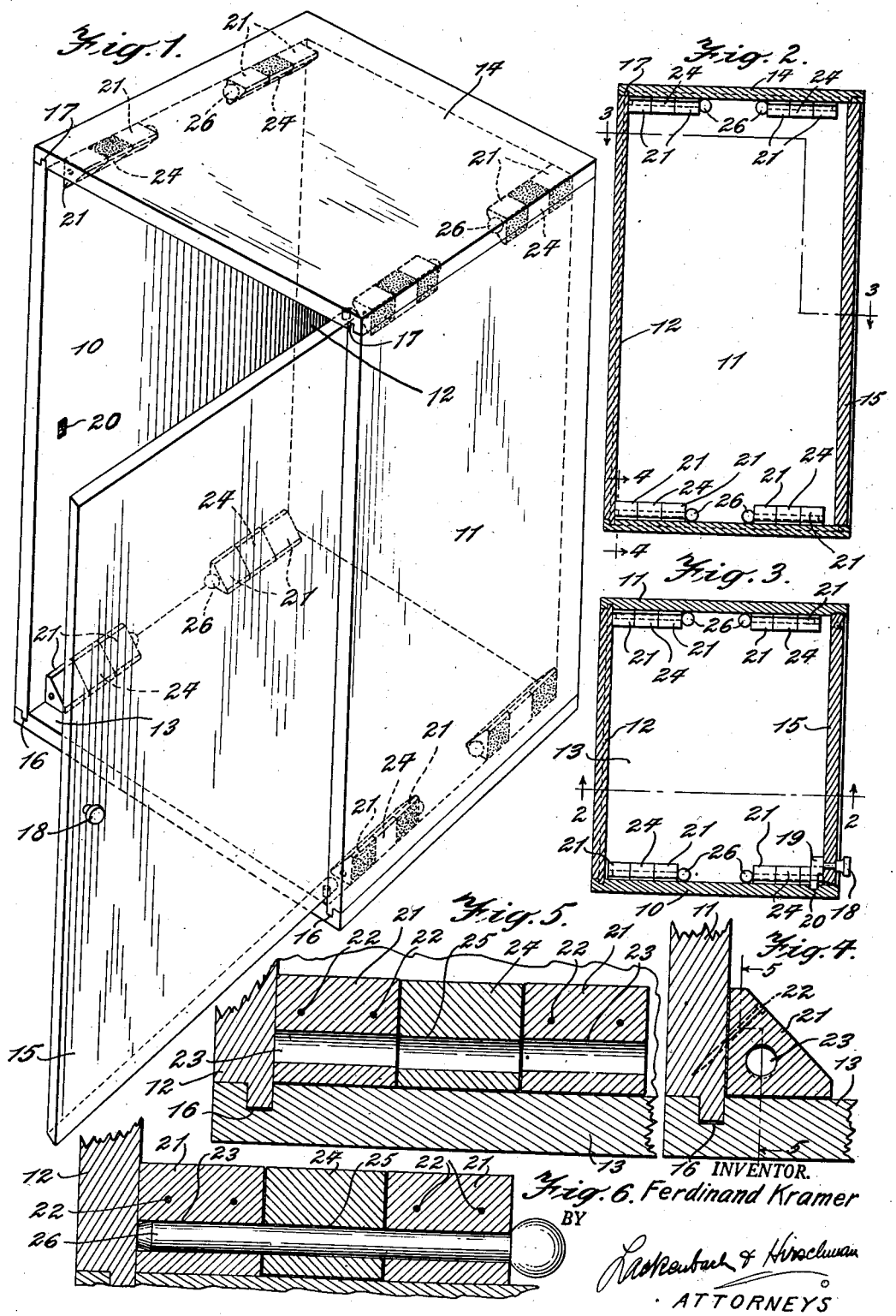
INVENTOR.
Ferdinand Kramer
BY
Lackenbach & Hirschman
ATTORNEYS Patented Nov. 14, 1944

2,362,904

UNITED STATES PATENT OFFICE 2,362,904

JOINT FOR DEMOUNTABLE FURNITURE

Ferdinand Kramer, Port Chester, N. Y., assignor to Allied Purchasing Corporation, New York, N. Y., a corporation of New York, Fred V. Gerstel, New York, N. Y., Ferdinand Kramer, Port Chester, N. Y., and Paul M. Mazur, New York, N. Y.

Application January 20, 1943, Serial No. 472,938

2 Claims. (Cl. 20—92)

The invention relates to a joint construction for detachably securing together parts or elements of a piece of furniture or similar article made primarily of wood, the article of furniture being of the knock-down type, i. e. readily assembled and dis-assembled.

The primary object of the invention is to provide a novel type of construction for joining together the structural elements of a piece of furniture, so that such elements may be readily stacked after taking them apart without the use of any tools, shipped or transported in such knock-down condition, and the piece of furniture re-constituted by erecting the elements and joining them together, again without the use of any tools.

Among specific objects of the invention is to provide means for detachably securing together parts of such a piece of knock-down furniture, in which the joint structure itself utilizes no metal parts but is constituted entirely and solely of elements easily fabricated and secured to the furniture members, for instance, constructed of wood or other readily available material such as a composition material. As an ancillary to this object, it is a further object of the invention to make possible the fabrication of various types, styles and constructions of wooden furniture such as utility cabinets, cupboards, book cases, chairs, tables, etc., all essential or frame structural parts of which can be fabricated of wood and are elements which can be detachably secured together for facility of erection and dismantling, while at the same time giving, by reason of the novel joint structure utilized, the utmost rigidity to the piece of furniture in its erected condition.

This rigidity of the assembled piece of furniture is secured primarily, although not entirely, by reason of the use of a joint construction which permits the ready assembly of the structural elements of the piece of furniture without the use of any tools whatsoever but affecting a positive and rigid connection between two structural elements joined together by a slight displacement of the joint elements with respect to each other once the elements have been generally juxtaposed and secured together. This feature of my novel joint construction is accomplished by providing a slightly eccentrically displaced series of elongated apertures extending throughout the length of three adjoining fastener members, one elongated aperture extending through one of the joining members being slightly eccentric with respect to the linear disposition of the two other apertures extending through the remaining two joint elements. Thus, when the retaining pin or dowel is inserted into the three aligned apertures of the three adjacent joint members, the pin or dowel will be securely held in position by the stresses produced by the passage, through the three apertures, of the pin or dowel.

In its broadest aspect, my invention comprises the provision of a joint structure for detachably securing together two adjacent sections of a piece of furniture in which one of the sections to be joined is provided with projecting members disposed so as to leave between them a recess which is to receive a correspondingly configured projection extending from the second section to be joined, each of the three projections being provided with an elongated central aperture, the three apertures being in substantial alignment when the two sections are brought into juxtaposition to receive a connecting link, pin, or dowel. A feature of this construction is that it utilizes connecting members for the joint structure constituted entirely and solely of wooden elements.

While my novel joint construction for knock-down furniture is capable of utilization in joining together the parts or elements of any piece of furniture, the most simple application of my invention and therefore that selected for illustration in the accompanying drawing, is its utilization in the erection of a simple article of furniture such as a general utility cabinet. This article is selected for purposes of illustration as it is of simple rectangular form. It should be understood, of course, that although the application of my novel joint structure is illustrated in connection with such simple form of structure, it is equally applicable for utilization in joining together the structural elements of a more complicated design, style or construction, such as is generally used in the designing of modern pieces of furniture, or any other article.

In the accompanying drawing illustrating this simple embodiment of my invention as applied to a general utility cabinet, Fig. 1 is a perspective view of such a cabinet, in the fabrication and erection of which my novel joint structure is utilized; Fig. 2 is a vertical section through the utility cabinet along the line 2—2 of Fig. 3; Fig. 3 is a horizontal section through the cabinet along the line 3—3 of Fig. 2; Fig. 4 is a section along the line 4—4 of Fig. 2, on an enlarged scale; Fig. 5 is a section along the line 5—5 of Fig. 4, and Fig. 6 is a section similar to Fig. 5, showing the interposition of a dowel pin by means of which the adjoining sections of the cabinet are securely held together.

Referring more particularly to the drawing, in which similar reference characters identify similar parts in the several views, the utility cabinet includes two vertically extending sides 10 and 11, a rear panel 12, a base 13, top 14, and door 15. All of these elements of the cabinet may be constituted of any well-known wood construction, for instance, plywood.

The juxtaposition of the various structural sections of the cabinet may be accomplished in any suitable manner. In the particular embodiment illustrated, the base 13 is provided along its peripheral edges with grooves 16 two of which extend along the side edges of the base and one along the rear edge thereof. Into the grooves along the side edges of the base are positioned the correspondingly configured ends of the side sections 10 and 11 of the cabinet and into the rear groove extends the bottom of the rear section 12 of the cabinet. The top panel 14 is provided with similar grooves 17 into which the correspondingly configured upper edges of the side and rear panels fit. The cabinet structure is completed by door 15, which is pivotally secured between the top and bottom panels by means of pins fitting into holes in the top and bottom panels. The door is provided with a knob 18 which may be either of wood or plastic composition, to the inner end to which is secured a latch member 19 the tongue of which is adapted to enter a recess 20 in the adjacent side panel to complete the closure of the cabinet.

Near the upper and lower edges, and adjacent the corners thereof, of each of the side panels 10 and 11, are secured preferably triangular shaped extension members 21, two such members being secured near each corner of the panel with the two members separated by a distance substantially equal to the length of each member. The extension members 21 may be secured to the panels 10 and 11 by adhesive, and also by nails or brads 22. The two spaced extension members 21 have passing through each an aperture 23 from one end of the member to the other.

To the base panel and the top panel are secured, also by an adhesive and brads, similarly configured triangular projecting members 24, such members being so disposed that when the side panels 10 and 11 are positioned in the grooves between the base and top panels, the projecting members 24 will take a position within the spacing between two of the extension members 21, so that the three adjacent members 21, 24, and 21 will be in substantial alignment.

The member 24 is likewise provided with an aperture 25 which, however, extends through the member 24 in a line very slightly eccentric with the alignment of the two apertures 23 in the adjacent members 21, as clearly shown in Figs. 4 and 5.

With the various sets of extension members 21, 24, and 21 in the four interior corners of the cabinet in position upon the assembling of the panel sections of the cabinet, the sections are permanently and rigidly secured together by passing a dowel pin 26 through the three aligned apertures of the three extension members. As the body of the dowel pin is passed through the three apertures, the central aperture, i. e. that of the member 24, will be brought into exact alignment with the apertures of the two other extension members 21, and will thus provide a rigid securement together of the side panels to the base and top panels of the cabinet.

The fitting of the dowel pin 26 into the three aligned apertures is such that by reason of the eccentric relationship between the central aperture and the two side apertures, the dowel pin will be snugly fitted into the three apertures and will cause the panels to be joined together to be brought to closer relationship and thereby secure a rigid connection between the panels. However, the dowel pin, being also made of wood, is readily disengageable from its position extending through the three aligned apertures, and by merely grasping the knob end of the dowel and pulling thereon, the dowel pin can be easily withdrawn and the panel sections readily taken apart when disassembling the cabinet structure.

The entire cabinet structure can be erected and a rigid connection of all structural parts thereof secured with great dispatch and with facility. On the other hand, the joint construction permits a rapid and easy disassembling of the cabinet parts.

It will be understood that the particular configuration of the projecting members 21 and 24 as shown and described is merely illustrative and that any shape, size or form of extension or projecting member may be utilized, so long as such members are provided with substantially aligned apertures extending through the members to receive a dowel pin for joining together the projecting members of two adjacent panels or structural elements of the cabinet or piece of furniture. Also, while I have illustrated a particular shape and form of dowel pin, it is obvious that any other similar connecting member may be used without departing from my invention. Likewise, the number of projecting members, three in the embodiment illustrated, is not of the essence of my invention as any number of such projecting members may be used, irrespective of how far they extend along the bases of the adjoining panels which are to be secured together.

The novel joint hereinabove described and illustrated in the drawing, makes possible the ready setting up and disassembling of any article of furniture in the construction of the several parts of which the joint elements have been embodied. The joint, as heretofore stated, is characterized by being constituted solely and entirely of wood with the evident advantages of such construction, including freedom from rust, freedom from binding, and the absence of any necessity of using any tools, either in the erection or dismantling of the article of furniture.

I claim:

1. A rigid corner joint structure for adjacent sections of demountable furniture comprising a plurality of blocks located next to each other in the direction of the joint in full surface contact with the said sections and alternately secured thereto so as to provide a shoulder abutment, cylindrical bores in the said blocks extending parallel to the block edges, said bores being arranged in alternate eccentric relation, and a cylindrical dowel pin adapted to force said blocks upon insertion into said bores into alinement, said dowel pin and said blocks being interlocked upon insertion of said pin on a substantial part of their surface by oppositely directed pressure forces.

2. A rigid corner joint structure for two adjacent sections of demountable furniture, comprising rectilinear triangular blocks next to each other in the direction of the joint in full surface contact with the said sections and alternately secured thereto so as to provide a shoulder abutment, cylindrical bores in the said blocks extending parallel to the block edges, said bores being arranged in alternate eccentric relation, and a cylindrical dowel pin adapted upon introduction in said bores to force said blocks into alinement, said dowel pin and said blocks being interlocked upon insertion of said pin on a substantial part of their surface by oppositely directed pressure forces reactive in the hypothenuse plane of said blocks.

FERDINAND KRAMER.